W. BRODIE & E. COMFORT.
Bracket.

No. 205,722.   Patented July 9, 1878.

Attest.
Henry V. Buckley
Albert E. Zacherle

Inventors.
William Brodie
Ezra Comfort
per George E. Buckley
atty.

UNITED STATES PATENT OFFICE.

WILLIAM BRODIE AND EZRA COMFORT, OF PHILADELPHIA, PA.

IMPROVEMENT IN BRACKETS.

Specification forming part of Letters Patent No. 205,722, dated July 9, 1878; application filed April 22, 1878.

*To all whom it may concern:*

Be it known that we, WILLIAM BRODIE and EZRA COMFORT, both of Philadelphia, State of Pennsylvania, have invented certain new and useful Improvements in Extension-Brackets; and we do hereby declare the following to be a full, clear, and exact description of the same, reference being had to the annexed drawings, making part hereof.

The nature of our invention is fully set forth in the following description and claims, and, to enable others skilled in the art to make and use it, we will describe its construction and operation.

Figure 1:
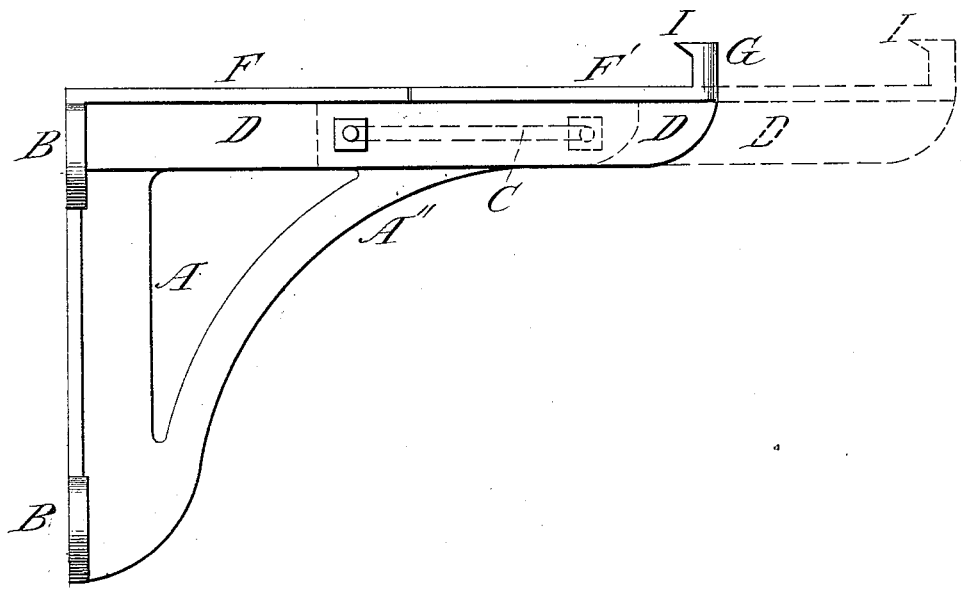
Figure 2:
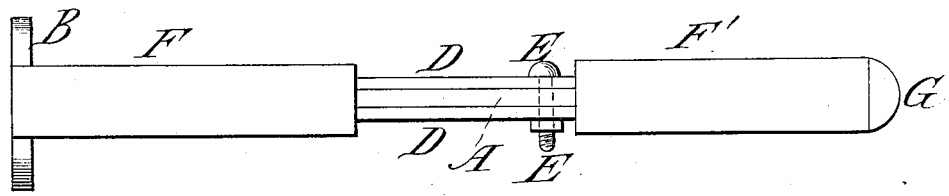

In the drawings, Figure 1 is a side view of our device, showing in dotted lines the slot and the extensible arm pulled out; Fig. 2, a plan view of the same.

A is the frame. B are ears attached to the frame, through which are screw-holes, to attach the apparatus to a wall. C is a horizontal slot in the upper projecting arm A' of frame A. D is a slide, clasping arm A' on both sides. E is a set-screw, or a screw and nut passing through the two sides of the slide and through the slot in arm A'. This serves to prevent the slide D from being drawn too far out, forming a stop. When slide D is pushed in this stop acts against the inner end or boundary of the slot, and when slide D is drawn out the screw traverses the slot until it comes up against the outer end or boundary of it, which checks the slide from going any farther out.

F F' is a flat bearing, to sustain whatever object is set upon the bracket. F' forms part of the slide D, and has an upright, lip, lug, or projection, G, upon its outer end, to prevent objects which are set upon the bracket from sliding off. The flat bearing F also forms a guide or stay to the inner part of slide D, to prevent the said inner end or part from being thrown up by a weight upon its outer end.

A'' is a brace or stay to strengthen the bearing capacity of the arm A', and forms part of the frame.

The slot in arm A' may be set farther back, if desired, so that screw E can be placed nearer to the inner end of slide D than it is at present.

If the bearing F is made broad enough a single bracket may be used to sustain objects set upon it; but we contemplate using our bracket principally for kitchen-sinks, and we shall commonly use two to a sink.

The advantage of the extensible feature of the bracket is that any number of brackets may be made up and sold as independent articles of sale and manufacture, and they can be made to fit any sized sink-basin, or almost any ordinary-sized article which it is desired to support in this way.

The brackets are first secured to the wall by means of screws through the ears B; the slide D in each is then drawn out, and the sink-basin is set upon the bracket; the slide D is then pushed in until the lip G impinges tightly against the front of the basin, and the screw-nut E is then tightened to prevent the loosening of the hold of the lip G upon the front of the basin by the working out of slide D.

If desired, an inwardly-projecting tooth may be cast upon the lug G, so as to bite into a depression upon the front of the basin, to hold the latter down as well as against the wall, as shown in dotted lines at I, Fig. 1.

The details of construction of our bracket can be much varied by those skilled in the art without altering the principle thereof—viz., that of being extensible and of holding upon its upper surface, between the point at which it is secured to the wall and its outer extremity, objects of widths as varying as the lengths to which our bracket can be extended.

By a reference to the drawings, it will be seen that the inner and outer extremities of the bearing-surface F F' of the bracket are always slightly above the line of the intermediate parts of the said surface, whether the slide is drawn out or not. The object of this construction is to insure the steadiness of any object set thereupon, to prevent rocking.

Any flat-bottomed object set upon the bracket, whether it is a sink-basin or shelving, will only touch the same at the outer and inner parts of the bracket, thus insuring steadiness.

Having thus described our invention, what we claim as new, and desire to secure by Letters Patent, is—

1. As a new article of manufacture, an extensible shelf-supporting bracket, consisting of the frame A, extension-arm A', having the slotted slide D guided and held by the stop-bolt E, the whole being so arranged that the two surfaces F and F' are substantially in the same plane, both when the bracket is extended and when it is closed, substantially as and for the purposes described.

2. The herein-described bracket, consisting of the slotted arm A', slide D, lug G, stop E, and frame A, the bearing-surface of the bracket being so constructed that its inner and outer extremities are always above the intermediate parts of such surface, substantially as and for the purpose set forth.

WM. BRODIE.
EZRA COMFORT.

Witnesses:
GEORGE E. BUCKLEY,
HENRY V. BUCKLEY.